(12) United States Patent
Zeijlstra et al.

(10) Patent No.: US 10,299,623 B2
(45) Date of Patent: May 28, 2019

(54) COFFEE DISPENSING APPARATUS

(71) Applicant: KONINKLIJKE PHILIPS N.V., Eindhoven (NL)

(72) Inventors: Harmina Christina Zeijlstra, Eindhoven (NL); Job Lipsch, Eindhoven (NL); Mart Kornelis-Jan Te Velde, Eindhoven (NL); Johan Marra, Eindhoven (NL); Karel Johannes Adrianus Van Den Aker, Eindhoven (NL); Jasper De Vreede, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 129 days.

(21) Appl. No.: 15/322,484

(22) PCT Filed: Jun. 25, 2015

(86) PCT No.: PCT/EP2015/064331
§ 371 (c)(1),
(2) Date: Dec. 28, 2016

(87) PCT Pub. No.: WO2016/001047
PCT Pub. Date: Jan. 7, 2016

(65) Prior Publication Data
US 2017/0156542 A1    Jun. 8, 2017

(30) Foreign Application Priority Data

Jun. 30, 2014  (EP) .................................... 14174992

(51) Int. Cl.
*A47J 31/44*  (2006.01)
*A47J 31/06*  (2006.01)
*A47J 31/46*  (2006.01)

(52) U.S. Cl.
CPC ....... *A47J 31/4496* (2013.01); *A47J 31/0657* (2013.01); *A47J 31/46* (2013.01)

(58) Field of Classification Search
CPC ...... A47J 31/06; A47J 31/0605; A47J 31/061; A47J 31/0615–31/0652; A47J 31/0657; A47J 31/0663; A47J 31/0668–31/0678; A47J 31/40–31/41; A47J 31/44; A47J 31/4403–31/4496; A47J 31/46–31/462
USPC .................................................... 99/293, 294
See application file for complete search history.

(56) References Cited

U.S. PATENT DOCUMENTS

| | | |
|---|---|---|
| 2,757,846 A | 8/1956 | Varrin |
| 4,164,964 A | 8/1979 | Daniels |
| 4,590,974 A * | 5/1986 | Mathews ................. B67D 1/06 141/1 |
| 4,614,964 A | 9/1986 | Sutrina |
| 4,712,591 A | 12/1987 | McCann |
| 4,738,285 A | 4/1988 | Belland |

(Continued)

FOREIGN PATENT DOCUMENTS

| | | |
|---|---|---|
| EP | 0424682 A1 | 5/1991 |
| EP | 2168468 A1 | 3/2010 |

(Continued)

*Primary Examiner* — Sang Y Paik

(57) ABSTRACT

A coffee dispensing apparatus includes a base and an at least one nozzle. Further, base and nozzle are arranged such that the dispensed coffee flows via inner upstanding wall of a standard sized coffee container.

15 Claims, 8 Drawing Sheets

(56) References Cited

U.S. PATENT DOCUMENTS

| | | | |
|---|---|---|---|
| 4,753,277 | A | 6/1988 | Holcomb |
| 4,972,883 | A | 11/1990 | Hassell |
| 5,086,817 | A * | 2/1992 | Murphy ............... B67D 1/1272 141/266 |
| 5,228,486 | A | 7/1993 | Henninger |
| 5,309,960 | A | 5/1994 | Boyd |
| 7,591,217 | B2 | 9/2009 | Kodden |
| 7,946,219 | B2 | 5/2011 | Marconi |
| 9,072,406 | B2 | 7/2015 | Larzul |
| 2013/0206013 | A1 | 8/2013 | De'Longhi |
| 2015/0342396 | A1* | 12/2015 | De'Longhi ............. A47J 31/46 99/300 |

FOREIGN PATENT DOCUMENTS

| | | | |
|---|---|---|---|
| EP | 2392240 | A1 | 12/2011 |
| EP | 2548481 | A1 | 1/2013 |
| GB | 2151584 | A | 7/1985 |
| GB | 2431396 | A | 4/2007 |
| WO | 2006015950 | A1 | 2/2006 |
| WO | 2013041580 | A1 | 3/2013 |

* cited by examiner

Top View
Improved crema layer

COFFEE DISPENSING APPARATUS

This application is the U.S. National Phase application under 35 U.S.C. § 371 of International Application No. PCT/EP2015/064331, filed on Jun. 25, 2015, which claims the benefit of International Application No. 14174992.9 filed on Jun. 30, 2014. These applications are hereby incorporated by reference herein.

FIELD OF THE INVENTION

The invention relates to a coffee dispensing apparatus and in particular coffee dispensing apparatus producing a crema layer in the coffee container.

BACKGROUND OF THE INVENTION

Currently, there are multiple types of coffee dispensing apparatuses available in the market place. Few examples of coffee machines include but are not limited to pod based coffee machines, capsule based coffee dispensing apparatuses, espresso machines, etc. Typically, in such apparatus, during the preparation/brewing of the coffee, air is vigorously mixed with the freshly brewed coffee before it is released into the cup (i.e. the coffee container). This results in the mechanical formation of foam bubbles which subsequently mix with coffee and create a crema/foam layer in the cup. One such device for producing a foam layer on the top of coffee is described in EP1460921B1.

In the current appliances, aesthetics, such as, texture, color, etc. of the crema layer get disturbed when the coffee and the bubble mixture are released from a spout/nozzle in to the cup. To further elaborate, it is rather the homogeneity of the crema layer that gets affected. In other words, the texture and the color of the brewed coffee is not uniform in nature. For instance, some large bubbles are observed together with much smaller bubbles (see FIG. 1). Furthermore, the color of the crema in one part of the cup is also lighter/different than the color of the crema in the other part of the cup.

SUMMARY OF THE INVENTION

It is an object of the present invention to provide a coffee dispensing apparatus which is suitable to provide a uniform cream layer on the coffee collected in a standard sized coffee container.

The object of the present invention is provided by a coffee dispensing apparatus comprising at least one nozzle for dispensing coffee and a base for receiving at least one standard-sized coffee container at a filling position to collect the dispensed coffee, characterized in that the at least one nozzle and the filling position at the base are arranged with respect to each other to hit the dispensed coffee directly at an inner upstanding wall of the at least one container placed at the filling position, such that the dispensed coffee hits at the inner upstanding wall of the container at a position that is at least at 80% of the height of the upstanding wall, wherein the base comprises a flat lower surface and an inclined upper surface, the upper surface inclines at a first pre-determined angle with respect to the flat lower surface, the filling position being located at the inclined upper surface.

By arranging the standard sized coffee container at the filling position on the base with respect to the at least one nozzle, it is achieved that the coffee that is coming out/from the at least one nozzle/jet of coffee stream does not contact the collected coffee in the container directly, thereby not disturbing the crema/foam layer that is being formed on the coffee/coffee brew in the container. Furthermore, it may be understood that in order to maintain the aesthetic quality of the coffee crema layer, the jet of the coffee stream should not directly come in contact with the collected coffee in the container for a significant part of the brewing process. Thus, it is envisioned that if the dispensed coffee hits the inner upstanding wall at at least 80% of inner upstanding wall's height, then the significant portion of the coffee brewing process would have been completed before the dispensed coffee directly contacts the collected coffee in the container and thereby, generating a better and improved crema layer on the coffee. Note that the upper edge of the coffee container is located at a position that is at 100% of the inner upstanding wall's height.

In other words, it is thus also desired that during the dispensing cycle, the at least one nozzle and filling position at the base are arranged with respect to each other to pour/transfer at least 80% of the dispensed coffee via the inner upstanding wall in the container.

The at least one nozzle and the filling position at the base are arranged such that the dispensed coffee, during the dispensing cycle, hits the inner upstanding wall at an angle ranging between 10-20 degrees with respect to the inner upstanding wall.

Further, the first pre-determined angle is substantially 10 degrees, i.e. +/−2 degrees. It may be obvious that given the shape of standard sized coffee containers, if the base of the appliance is, for example, tilted to 15 degrees, then the dispensed coffee may actually spill out of the container before the brewing process is actually completed.

Furthermore, the base also has one or more retaining means to retain the at least one container at the filling position at the first pre-determined angle with respect to the flat lower surface. The base in addition to retaining the coffee container at the filling position, also defines the relative position of the container with respect to the at least one nozzle. The relative position of the container ensures that the coffee/coffee brew, for most of the dispensing cycle, is received via the inner upstanding wall. Because the container, facing towards the coffee machine, is inclined, the dispensed coffee falls into the container via/along the inner upstanding wall.

According to an alternate solution, the coffee dispensing apparatus has a displacing means to move the at least one nozzle in substantial close proximity to the inner upstanding wall. Preferably, the displacing means and the at least one nozzle are operationally connected through a pivoting joint on the coffee dispensing apparatus, wherein the apparatus is arranged to move the at least one nozzle in substantial close proximity to the inner upstanding wall of the container by a force. Alternatively, the displacing means are arranged to be actuated by the container when it is placed at the filling position to move the displacing means to position the at least one nozzle in substantial close proximity to the inner upstanding wall. The at least one nozzle, as explained in the current solution, has an extended outlet.

In various embodiments of the invention, it is ensured that the dispensed coffee hits the inner upstanding wall just below the upper edge of the container and flows along the inner upstanding wall, thereby, avoiding the dispensed coffee to directly contact the coffee jet for most of the dispensing cycle, and thus producing a good crema layer on the coffee collected in the container.

Embodiments of the coffee dispensing apparatus include but are not limited to a pod based coffee machine, a capsule based machine, an espresso machine, and the like.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept.

FIG. 3b shows a cross sectional view of the base depicted in FIG. 3a;

DETAILED DESCRIPTION OF THE DRAWINGS

Figure 1:
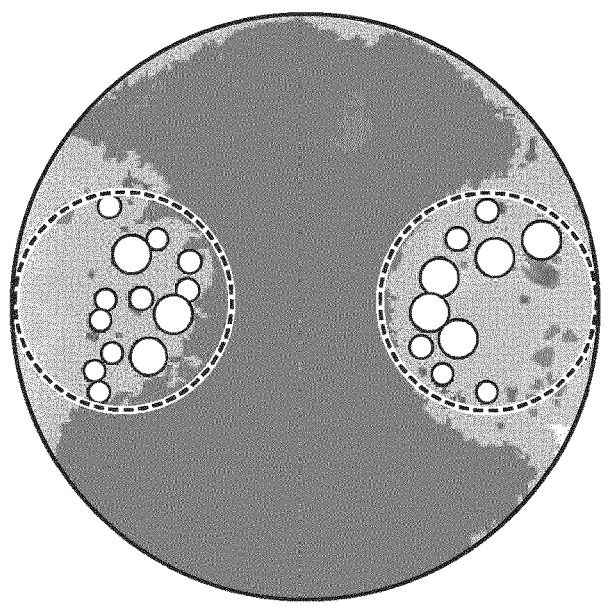
FIG. 1 shows a top view of the froth prepared by current coffee dispensing apparatus.
Figure 2:
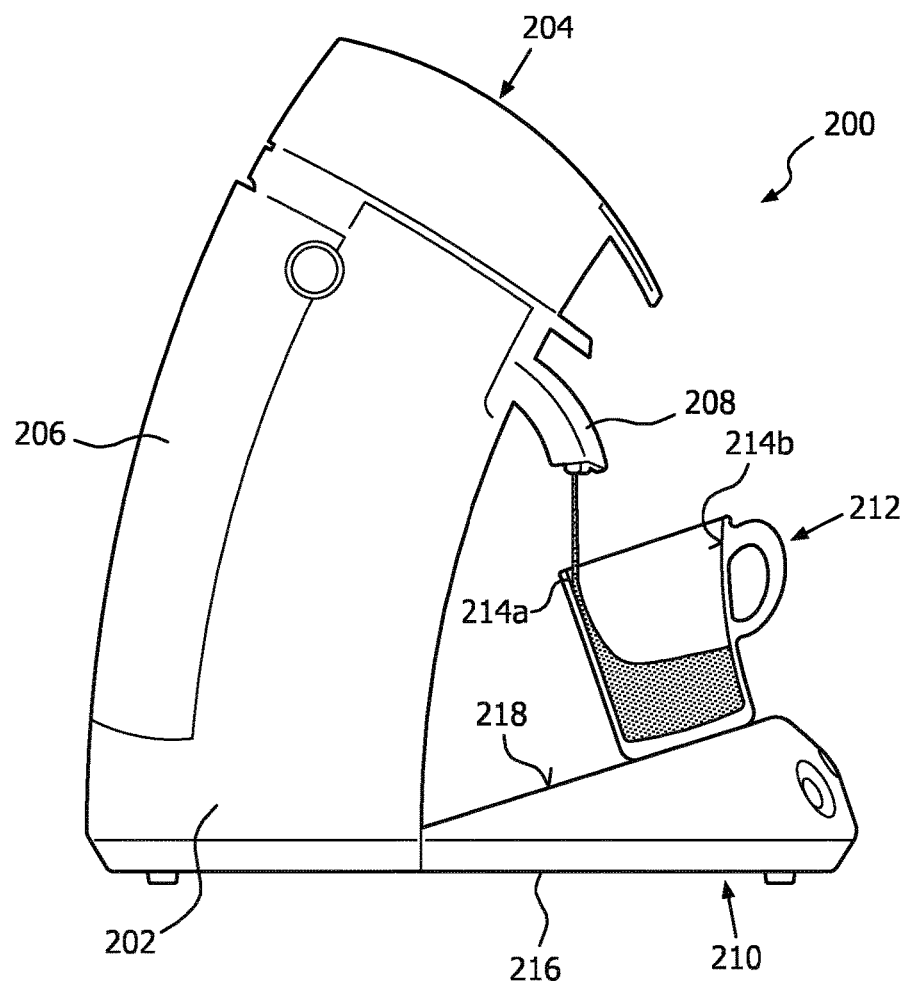
FIG. 2 shows an embodiment of a coffee dispensing apparatus according to the invention.

FIG. 2 shows an embodiment of a coffee dispensing apparatus 200 according to the invention. Coffee dispensing apparatus 200 includes a body 202, a brewing space 204, a water container 206, at least one nozzle 208, and a base 210 arranged to support at least one standard sized coffee container 212, herein after referred to as a container 212.

Container 212 is placed at a filling position on base 210. It is understood from common general knowledge that container 212 includes a base supporting two inner upstanding walls 214a and 214b. In various embodiments of the invention, the filling position is defined as a position that is suitable/appropriate with respect to the position of nozzle 208 to receive coffee in container 212. This may be marked with the help of a sign, marking, etc. on base 210 for the user's benefit to help him place container 212 at the appropriate position.

The filling position is further defined such that the coffee stream/jet of coffee hits at an angle with respect to inner upstanding wall 214a. In various embodiments of the invention, the angle is ranging around 10-20 degrees. The relation between the range of the angles between the jet of coffee stream and inner upstanding wall 214a is further explained in detail in conjunction with FIG. 6 and FIGS. 7(a)-(d). It may be obvious to a person skilled in the art that inner upstanding wall 214a, which receives the coffee, is closer to nozzle 208 than the other inner upstanding wall 214b of the container. However, the invention, with modifications to apparatus 200, can also be practiced with the other inner upstanding wall 214b of container 212.

Further, base 210 is arranged to receive container 212 at the filling position at a pre-determined angle towards (in the direction of) body 202 of apparatus 200. The pre-determined angle is substantially is 10 degrees +/−2 degrees. In an embodiment of the invention, the base includes a flat lower base/surface 216 and an inclined upper surface 218. Inclined upper surface 218 inclines at substantially 10 degrees with respect to flat lower base 216. Upper surface 218 further has one or more retaining means to retain the container at the filling position. The retaining means (not depicted in the figures) for instance can be but are not limited to one or more rubber grooves, an obstruction on the base, etc. to offer sufficient resistance to container 212 against movement/sliding towards apparatus 200.

Figure 3A:
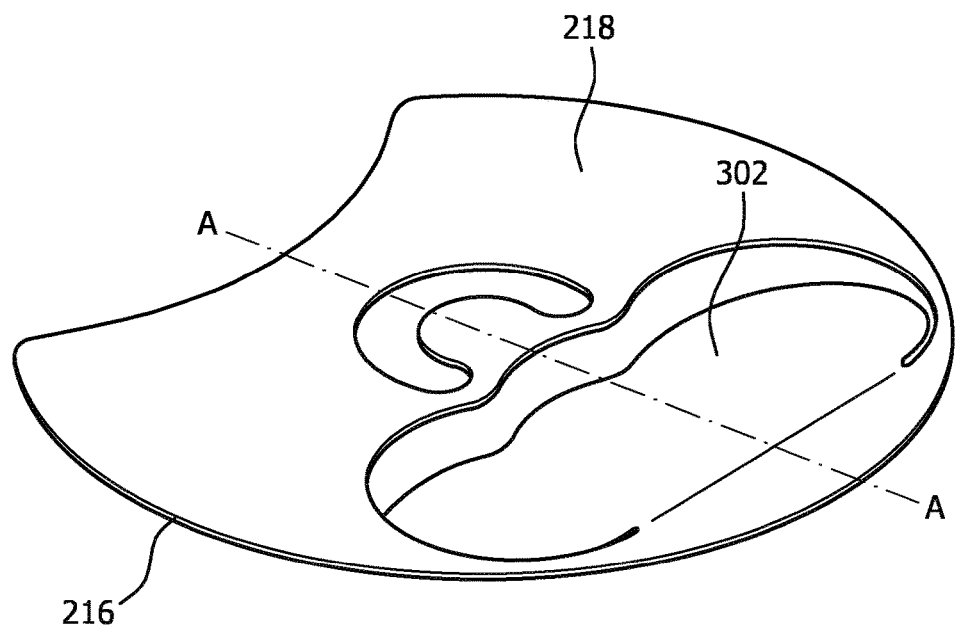
FIG. 3a shows a base with one more retaining means used in an embodiment of the coffee dispensing apparatus of the invention.
Figure 3B:
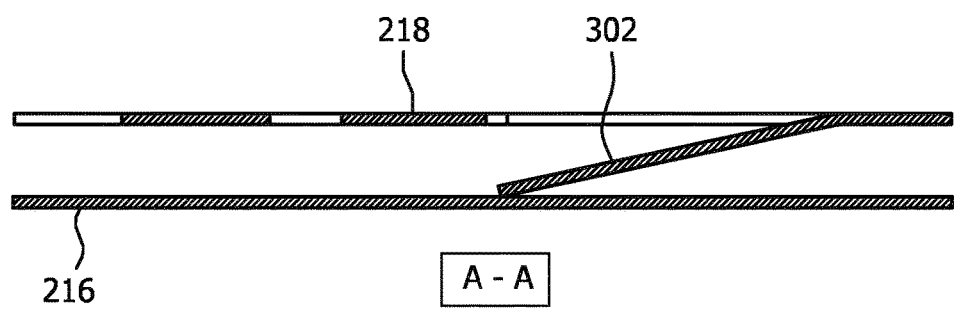

In another embodiment of the coffee dispensing apparatus according to the invention (FIG. 3a and FIG. 3b), upper surface 218 is parallel (and not inclined) with respect to flat lower base 216. Upper surface 218 includes one or more retaining means 302, preferably a flat plate, to receive and retain container 212 at the first pre-determined angle with respect to the flat lower base. Retaining means 302 can, for instance, be an inclined surface defined as a part of the upper surface 218 or flat lower base 216.

Similarly, such retaining means 302, which can receive and retain, can be as well included in base 210 shown in FIG. 2. It may be evident that such a flat plate 302 will then be mostly parallel to inclined upper surface 218 in order to maintain the first pre-determined angle of inclined upper surface 218.

In various embodiments of the coffee dispensing apparatus according to the invention, base 210 also functions as regular drip tray.

In operation, nozzle 208 dispenses coffee on inner upstanding wall 214a and the coffee subsequently flows into container 212 via and along inner upstanding wall 214a under the driving force of gravity. The coffee jet hits at a position, on inner upstanding wall 214a, that is at least 80% of the height of inner upstanding wall 214a. In a preferred embodiment, the perfect crema layer is created when jet of coffee coming out nozzle 208 never directly contacts the collected coffee in container 212. However, it must be understood that container 212 can vary based on the selection/preference of the user and thus, it is desired that at least 80% of the volume of the dispensed coffee flows along inner upstanding wall 214a so that direct contact between coffee jet and the coffee collected in the container can be avoided for most of the dispensing cycle. Therefore, for most containers 212, at least 80% height of inner upstanding wall 214a is desired height for achieving aesthetically appealing crema layer. This is further explained in conjunction with FIG. 6 and FIGS. 7(a)-(d). The coffee crema layer thus formed is more homogenous in color and texture and thus visually more appealing. In an embodiment of the invention, the aesthetics mostly concerns the fineness of the crema texture and its lateral color homogeneity.

In yet another embodiment of the coffee dispensing apparatus 200 according to the invention, apparatus 200 includes a vertically adjustable nozzle 208 with respect to base 210.

Figure 3C:
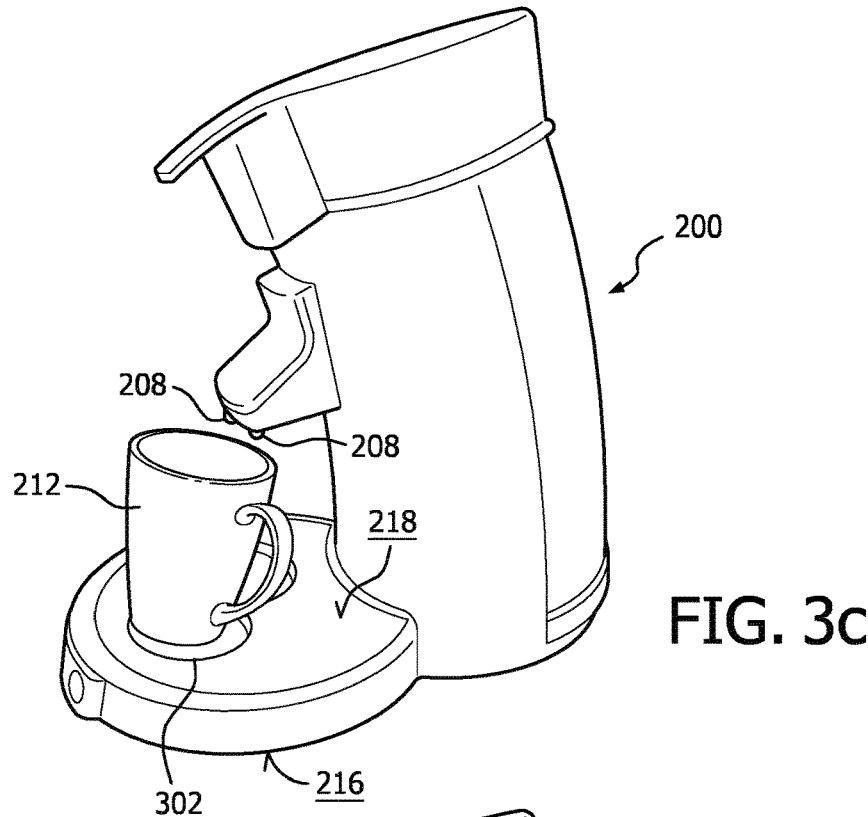
FIGS. 3c and 3d show embodiments of the coffee dispensing apparatus according to the invention with one or more standard sized coffee containers at the filling positions.
Figure 3D:
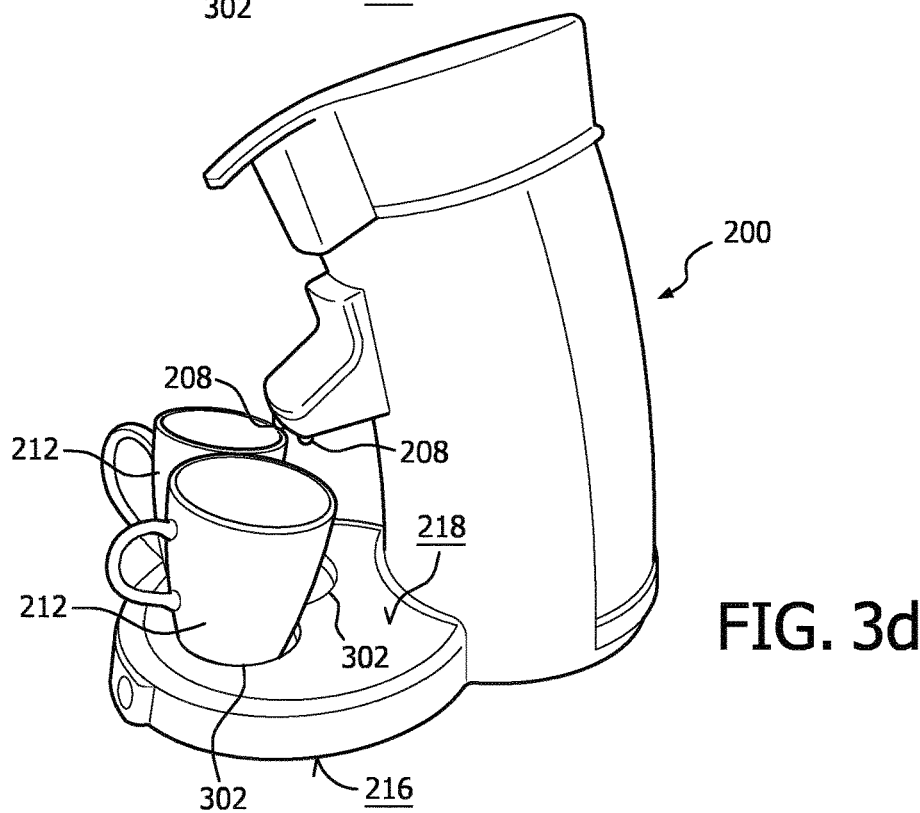

FIG. 3c and FIG. 3d show the placement of one or more containers at the filling position. It may be understood that each container 212 receives coffee from the corresponding nozzle 208 (depicted in FIG. 3d). However, two nozzles, such as nozzle 208, can also be arranged to fill coffee in a single container, such as container 212 (depicted in FIG. 3c). Further, it may be obvious that apparatus 200 can be arranged such that more than two containers can be received at the corresponding filling positions.

Figure 4A:
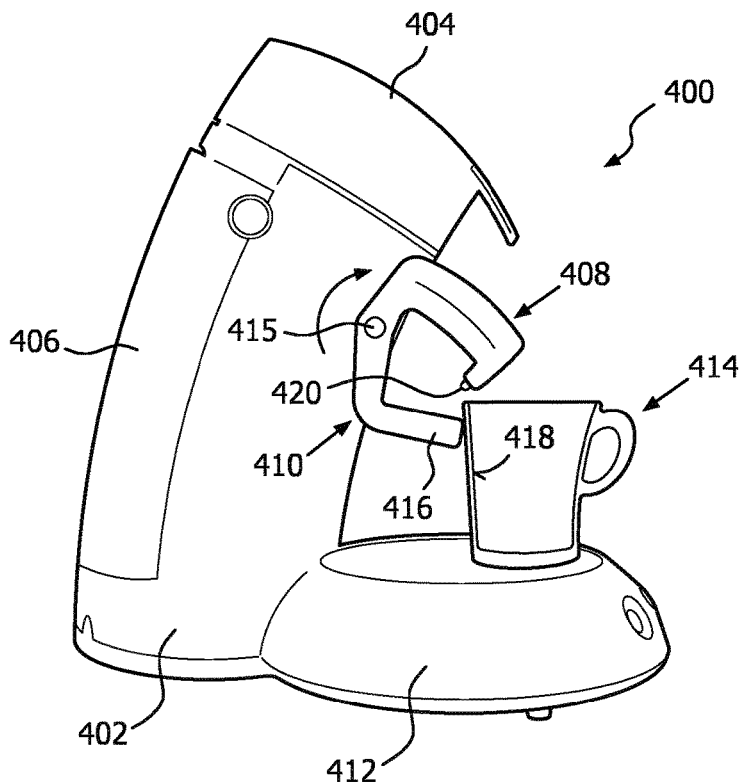
FIGS. 4a and 4b show another coffee dispensing apparatus for preparing a crema layer in a standard sized coffee container.
Figure 4B:
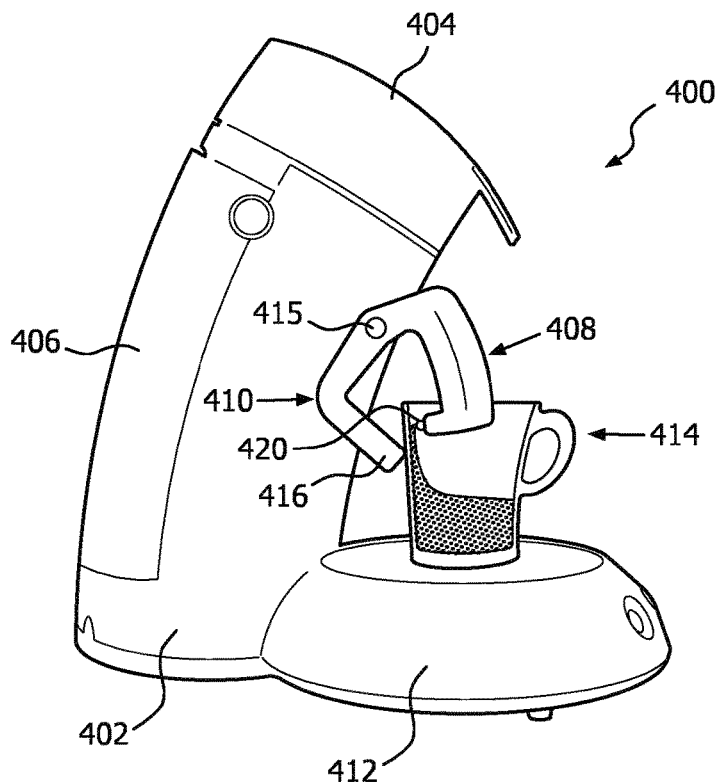

FIGS. 4a and 4b shows another embodiment of the coffee dispensing apparatus 400. Coffee dispensing apparatus 400 includes a body 402, a brewing space 404, a water container 406, at least one nozzle 408, a displacing means 410 and a base 412 arranged to support at least one standard sized coffee container 414, herein after referred to as a container 414.

In an embodiment of the coffee dispensing apparatus 400, displacing means 410 is operationally, preferably by pivoting joint 415, connected to at least one nozzle 408. In operation, a force applied, in the direction of apparatus 400, at distal end 416 of displacing means 410 moves nozzle 408 closer (clockwise) to apparatus 400. Similarly, the force applied, in the direction away from apparatus 400, at distal end 416 of displacing means 410 moves nozzle 408 away (counter-clockwise) from apparatus 400. Thus, in operation, when container 414 is placed on base 412 and is further used to push displacing means 410 at distal end 416 towards apparatus 400, nozzle 408 is moved into container 414. Nozzle 408 moves to a substantial close proximity to inner upstanding wall 418 of container 414 when container 414 is pushed till the filling position. Nozzle 408, once in substantial close proximity, is arranged to hit the coffee stream during the dispensing cycle at an angle with respect to inner upstanding wall 418. The angle ranges between 10-20 degrees (inclusive). Further, nozzle 408 is arranged such that the dispensed coffee hits at a position (on inner upstanding wall 418) that is at least 80% height of inner upstanding wall 418. It may be understood that substantial close proximity is defined such that nozzle 408 does not touch the inner upstanding wall 418 but is only close enough to let the dispensed coffee flow along inner upstanding wall 418 in container 414. In an embodiment of coffee dispensing apparatus 400, nozzle 408 is designed such that nozzle 408 has an extended outlet 420 so that outlet 420 is close enough to inner upstanding wall 418 of container 414.

In another embodiment apparatus 400 may have one or more sensors (not depicted in the figures) to detect the presence of container 414 at the filling position and automatically move nozzle 408 in substantial close proximity to the inner upstanding wall.

In yet another embodiment of the coffee dispensing apparatus 400, the apparatus 400 includes a vertically adjustable nozzle 408 with respect to base 412.

FIG. 4a and FIG. 4b disclose an alternate solution for providing a uniform cream layer on the coffee collected in a standard sized coffee container 414. It may be noted that the disclosure with respect to FIG. 4a and FIG. 4b does not form part of the invention and thus do not fall in the scope of claims.

Figure 5:
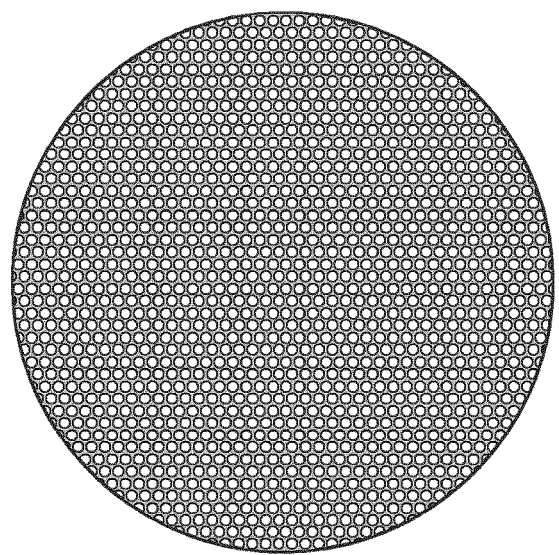
FIG. 5 shows a top view of the crema layer/froth prepared by a coffee dispensing apparatus according to the invention.

FIG. 5 shows an image of the froth/crema layer prepared by coffee dispensing apparatuses according to the embodiment of the invention. As depicted, the crema layer is homogenous (laterally) in nature. It is evident that the crema layer thus formed is free from large bubbles and is thus fine-textured. Also, since the dispensed coffee was collected via the inner upstanding wall, the color of the froth/crema is substantially uniform across the container. It may be noted that FIG. 5 is only for schematic purposes to depict the fine crema generated in the container. It may be noted that the reasoning is true for the alternate solution discussed in FIG. 4a and FIG. 4b as well.

Figure 6:
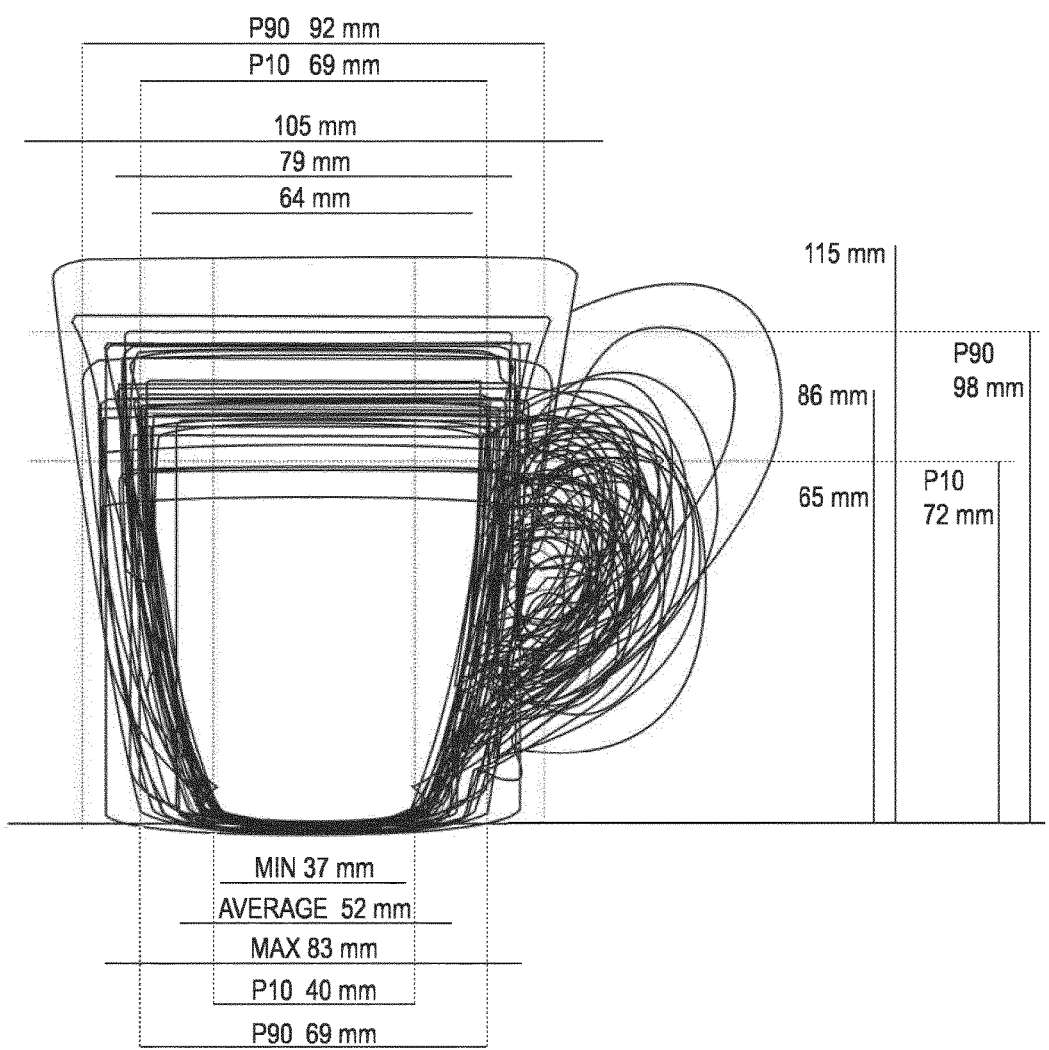
FIG. 6 shows an overlay of various standard sized coffee containers.
Figure 7A:
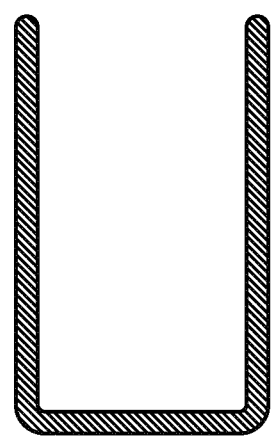
FIGS. 7a-7d show at least two types of standard sized coffee containers and their relation with the first pre-determined angle.
Figure 7B:
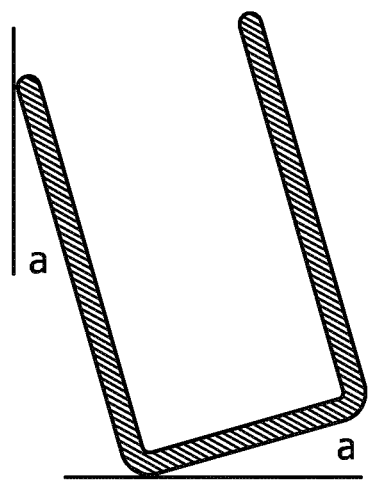
Figure 7C:
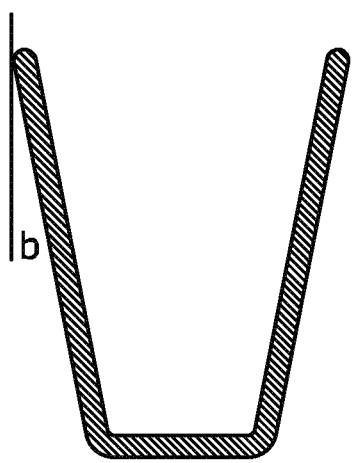
Figure 7D:
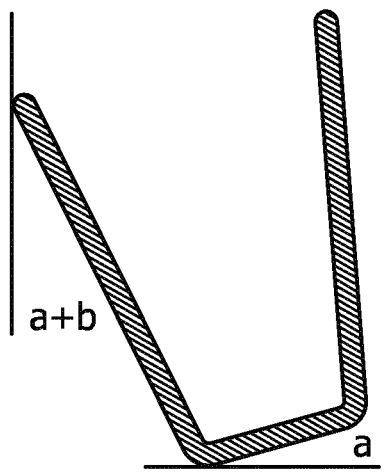

FIG. 6 shows an overlay of various standard sized coffee containers. Experiments were performed with wide range of coffee containers, such container 212/414 to determine the first pre-determined angle and angle between jet of coffee and inner upstanding wall, such inner upstanding wall 214a and 418, of the container.

Table below shows few observation of range of container dimensions used in the experiments.

| | Height (cm) | Top Diameter (cm) | Bottom Diameter (cm) | Angle of inner upstanding wall wrt to coffee stream (b) | Volume of the container (cc) |
| --- | --- | --- | --- | --- | --- |
| Average | 86.2 | 72.7 | 46.1 | 9.4 | 240.7 |
| min | 65.0 | 58.0 | 31.0 | 0.0 | 119.8 |
| max | 115.0 | 99.0 | 77.0 | 20.3 | 570.0 |
| St. Dev. | 9.8 | 8.9 | 11.1 | 3.8 | 99.7 |
| P10 | 74.5 | 63.5 | 34.5 | 5.7 | 148.7 |
| P90 | 97.0 | 83.0 | 60.0 | 13.8 | 381.6 |
| P5 | 70.0 | 61.8 | 33.3 | 3.7 | 140.5 |
| P95 | 98.8 | 88.3 | 67.3 | 14.6 | 424.9 |

For the sake of clarity it is to be noted that all containers with dimensions which fall within the ranges shown in table 1 are to be considered as standard sized coffee containers.

Based on the above mentioned information, the first pre-determined angle was chosen to be substantially 10 degrees to ensure that the complete volume of dispensed coffee is collected in the container. It may be thus understood that choosing the right pre-determined angle plays a very important role in ensuring that a good crema layer is achieved by the end of the coffee dispensing cycle. Given the large variety of containers, if the pre-determined angle of, for instance, 15 degrees is chosen, then the dispensed coffee may spill out of the container before the coffee dispensing cycle has completed. Similarly, if the pre-determined angle is 5 degrees, then the jet of coffee stream emerging from the nozzle will already start touching/hitting the collected coffee at relatively initial period of the coffee dispensing cycle, in other words, well before the coffee dispensing cycle has completed.

In addition to influencing the first pre-determined angle, the shape of typical containers also influence the selection of the range of angles between the vertically falling coffee stream and inner upstanding wall of the container. It has already been discussed that these angles range between 10-20 degrees. This can be further elaborated with the help of few examples concerning to the embodiment of the invention explained in FIG. 2, FIG. 3 and an alternate solution explained in FIG. 4.

In the first example, if the chosen container has an inner upstanding wall that is substantially vertical, preferably +/−2 degrees, then the angle between the coffee stream/jet and the inner upstanding wall is 10 degrees only. This is achieved by virtue of the first pre-determined angle in the embodiment of the invention. It is further depicted in FIG. 7b. However, in the second example, if the chosen container is rather tapered, for instance at 5 degrees, then the angle between the coffee stream and the inner upstanding wall becomes 15 degrees (Tapered angle (b)+first pre-determined angle (a)). This is further depicted in FIG. 7d. It may be evident that in the alternate solution, since there is no inclined base, the angle is purely brought about by the virtue of the container and the nozzle arrangement (also depicted in FIG. 7a and FIG. 7c). If the angle is not maintained in this range, then the out coming coffee stream will either spill outside the container, which is undesirable, or create internal spatters, which will thereby disturb the homogeneity crema layer in the container.

Therefore, the angle between the coffee stream that is dispensed out of the nozzle and the inner upstanding wall of the container with/without the first pre-determined angle thus plays an important role in ensuring that coffee stream/jet hits at a substantial high point, but still below its upper edge (5-15 mm), at the inner upstanding wall of the container and pours in the container via/along the inner upstanding wall and thereby not disturb the crema layer formed in the container. Subsequently, based on the standard sized coffee containers, it is thus chosen to hit the coffee stream at a position (on the inner upstanding wall) that is at least 80% of the inner upstanding wall to ensure that most of the coffee volume is dispensed without getting in direct contact with the already collected coffee in the container. Further, it may be evident that for some of coffee containers that are tall enough will collect 100% of coffee via their inner upstanding wall. However, for other containers that might be a little shorter than average container will still collect at least 80% of the volume of dispensed coffee via their inner upstanding wall.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

The invention claimed is:

1. A coffee dispensing apparatus comprising:
   at least one nozzle for dispensing coffee;
   a flat plate; and
   a base for receiving at least one coffee container at a filling position to collect the dispensed coffee,
   wherein the at least one nozzle and the filling position at the base are arranged with respect to each other to hit the dispensed coffee directly at an inner upstanding wall of the at least one container placed at the filling position, such that the dispensed coffee hits at the inner upstanding wall of the container at a position that is at least at 80% of the height of the upstanding wall,
   wherein the base comprises a flat lower surface and an inclined upper surface, the upper surface inclines at a first pre-determined angle with respect to the flat lower surface, the filling position being located at the inclined upper surface, and
   wherein the flat plate is recessed in the inclined upper surface.

2. The coffee dispensing apparatus according to claim 1, wherein during a dispensing cycle, the at least one nozzle and filling position at the base are arranged with respect to each other to pour at least 80% of the dispensed coffee via the inner upstanding wall in the container.

3. The coffee dispensing apparatus according to claim 1, wherein the dispensed coffee flows along the inner upstanding wall.

4. The coffee dispensing apparatus according to claim 1, wherein the first pre-determined angle is substantially 10 degrees.

5. The coffee dispensing apparatus according to claim 1, wherein the base further comprises one or more retainers configured to retain the at least one container at the filling position at the first pre-determined angle with respect to the flat lower surface.

6. The coffee dispensing apparatus according to claim 1, wherein the base defines a relative position of the at least one container with respect to the at least one nozzle.

7. The coffee dispensing apparatus according to claim 1, wherein the at least one nozzle and the filling position at the base are arranged such that the dispensed coffee, during a dispensing cycle, hits the inner upstanding wall at an angle ranging between 10-20 degrees with respect to the inner upstanding wall.

8. The coffee dispensing apparatus according to claim 1, wherein the coffee dispensing apparatus is at least one of a pod based apparatus, a capsule based apparatus and an espresso machine.

9. The coffee dispensing apparatus according to claim 1, wherein the at least one nozzle is vertically adjustable with respect to the base.

10. The coffee dispensing apparatus according to claim 1, wherein the flat plate is parallel to the inclined upper surface.

11. The coffee dispensing apparatus according to claim 1, wherein the at least one nozzle is configured to move closer to the at least one coffee container in response to presence of the at least one coffee container at the filling position.

12. The coffee dispensing apparatus according to claim 11, further comprising a sensor configured to sense the presence of the at least one coffee container at the filling position and an actuator configured to automatically move the at least one nozzle closer to the inner upstanding wall of the at least one container.

13. The coffee dispensing apparatus according to claim 1, further comprising a pivot joint configured to pivotally connect the at least one nozzle to a body of the coffee dispensing apparatus, and wherein the at least one nozzle is configured to rotate about a pivot axis perpendicular to the pivot joint in response to placement of the at least one coffee container at the filling position.

14. The coffee dispensing apparatus according to claim 13, wherein the at least one nozzle includes an extension configure to contact an outer surface of the at least one container in response to placement of the at least one coffee container at the filling position for rotating the at least one nozzle about the pivot axis.

15. The coffee dispensing apparatus according to claim 1, wherein the at least one nozzle includes an extension configure to contact an outer surface of the at least one container in response to placement of the at least one coffee container at the filling position for rotating the at least one nozzle closer to the inner upstanding wall of the at least one container.

* * * * *